United States Patent
Chiricosta et al.

(10) Patent No.: US 7,579,974 B2
(45) Date of Patent: Aug. 25, 2009

(54) DIGITIZER FOR A DIGITAL RECEIVER SYSTEM

(75) Inventors: Mario Chiricosta, Massina (IT);
Philippe Sirito-Olivier, Martigues (FR);
Pietro Antonio Paolo Calò, Laterza (IT)

(73) Assignees: STMicroelectronics SA, Montrouge (FR); STMicroelectronics S.r.l., Agrate Brianza (MI) (IT)

(*) Notice: Subject to any disclaimer, the term of this patent is extended or adjusted under 35 U.S.C. 154(b) by 0 days.

(21) Appl. No.: 12/121,073

(22) Filed: May 15, 2008

(65) Prior Publication Data
US 2008/0284631 A1 Nov. 20, 2008

(30) Foreign Application Priority Data
May 18, 2007 (EP) .................... 07290645

(51) Int. Cl.
*H03M 1/12* (2006.01)
(52) U.S. Cl. ................... 341/156; 341/144
(58) Field of Classification Search .......... 341/144–170
See application file for complete search history.

(56) References Cited

U.S. PATENT DOCUMENTS

| | | | |
|---|---|---|---|
| 5,003,196 A | 3/1991 | Kawaguchi | 307/290 |
| 5,815,046 A * | 9/1998 | Spilker et al. | 332/103 |
| 6,008,749 A | 12/1999 | Smith | 341/163 |
| 6,661,361 B1 * | 12/2003 | Lewis et al. | 341/137 |

FOREIGN PATENT DOCUMENTS

| | | |
|---|---|---|
| GB | 2338850 | 12/1999 |
| JP | 61005229 | 1/1986 |
| JP | 07321704 | 12/1995 |

* cited by examiner

*Primary Examiner*—Lam T Mai
(74) *Attorney, Agent, or Firm*—Lisa K. Jorgenson; Allen, Dyer, Doppelt, Milbrath & Gilchrist, P.A.

(57) ABSTRACT

A digitizer for a digital receiver system includes an input terminal to receive a modulated analog input voltage signal, and an output terminal to provide an output voltage signal being a digital conversion of the input voltage signal. A comparator circuit has an output coupled to the output terminal and includes an operational amplifier having a first input terminal coupled to the input terminal. A threshold generator circuit is between the input terminal and a second input terminal of the at least one operational amplifier, to provide a tunable voltage reference signal thereto. The threshold generator circuit includes a thresholding circuit to determine a threshold voltage value of the modulated analog input voltage signal, and a tunable voltage reference circuit coupled to the thresholding circuit to generate the tunable voltage reference signal as a function of the threshold voltage value of the modulated analog input voltage signal.

18 Claims, 5 Drawing Sheets

DIGITIZER FOR A DIGITAL RECEIVER SYSTEM

FIELD OF THE INVENTION

The present invention relates to a digitizer for a digital receiver system. More specifically, the invention relates to a digitizer having an input terminal which receives a modulated analog input voltage signal, and an output terminal which provides an output signal being a digital conversion of the input voltage signal, and including a comparator circuit and a threshold generator circuit.

The invention also relates to a method for digitizing a modulated analog input voltage in a digital receiver system by means of the digitizer. The invention more particularly, but not exclusively, relates to a digitizer for an optical receiver, and the following description is made with reference to this field of application for convenience of explanation.

BACKGROUND OF THE INVENTION

A digital receiver is an electronic system for digital communications receiving an analog input signal and providing a digital output signal, and includes an amplifier, a filter, and a digitizer in the analog front-end.

In particular, the amplifier increases the input dynamic range of the receiver, thus helpfully providing a good level of the analog output signal. Moreover, the filter limits the noise bandwidth of the receiver, and the digitizer converts the analog input signal into the digital output signal.

The digitizer can be realized using a simple comparator or using a more complex "Analog to Digital Converter," depending on the input signal characteristics. In particular, a simple comparator can be used for distinguishing two different voltage signal levels. This is the case of a digital receiver having as input voltage signal an ASK [Amplitude Shift Keying] modulation signal, having an amplitude shift between zero and a power supply voltage Vdd, or an OOK [On-Off Keying] modulation signal.

A known digitizer 100 is shown in FIG. 1. It has an input terminal INPUT, which receives a modulated analog input voltage signal Vin, and an output terminal OUTPUT which provides an output signal Vout being a digital conversion of the input voltage signal Vin. The digitizer 100 further includes an R-C filter 102 which extracts the DC component of the analog voltage input signal Vin and provide it as voltage reference signal Vref to a comparator 101.

This simple circuit realizing the digitizer 100 may ensure that the voltage reference signal Vref is set between the voltage signals levels corresponding to a "0" logic transmitted and to "1" logic transmitted. Nevertheless, the limit of this circuit is that it works well so long as the data received is reasonably DC-balanced, or rather when the voltage reference signal Vref is more or less in a symmetric position between the minimum and the maximum of input signal.

In fact, it is clear from the response of the digitizer 100, shown in FIG. 2, that if the analog voltage input signal Vin is not symmetrical in respect with the DC component value, the voltage reference signal Vref may not be a good voltage reference signal for the comparator 101. Moreover, even the noise margin is very low, since a very low analog voltage input signal Vin would be close to the voltage reference signal Vref, causing the comparator be unstable.

In order to address this issue, some other architectures have been proposed. For example, U.S. Pat. No. 5,003,196 describes a Schmitt trigger circuit comprising a detector of maximum and minimum voltage and two comparators, sensing the rising and the falling edges of the input voltage signal Vin and converting them into an output digital signal using a SR (set-reset) flip-flop. Even though advantageous under several aspects, the described Schmitt trigger circuit may not be used in some kind of applications, for instance optical receivers.

The technical application underlying the present approach is that of providing a digitizer, and a method for digitizing, having structural and functional characteristics which allow the digitization of both a high input voltage signal and a low input voltage signal, and to help reduce effects on signal noise when the input voltage signal is null, in this way overcoming the limits which affect the devices realized according to the prior art.

SUMMARY OF THE INVENTION

The idea underlying the present approach is that of providing an adaptive digital conversion of the input voltage signal applied to an input terminal of a digitizer, the conversion depending on the sum of a constant voltage signal and a maximum value of the input voltage signal, in order to avoid a generation of an output signal when no signal is applied to the input terminal.

According to one embodiment, a digitizer for a digital receiver system comprises an input terminal to receive a modulated analog input voltage signal and an output terminal to provide an output voltage signal being a digital conversion of the input voltage signal. A comparator circuit having an output is coupled to the output terminal and comprises at least one operational amplifier having a first input terminal being coupled to the input terminal. There is a threshold generator circuit between the input terminal and a second input terminal of the at least one operational amplifier, to provide a tunable voltage reference signal thereto. The threshold generator circuit comprises a thresholding circuit to determine a threshold voltage value of the modulated analog input voltage signal, and a tunable voltage reference circuit coupled to the thresholding circuit to generate the tunable voltage reference signal as a function of the threshold voltage value of the modulated analog input voltage signal.

The characteristics and advantages of this digitizer and of this digitizing method will be apparent from the following description of an embodiment thereof given by way of indicative and non limiting examples, with reference to the annexed drawings.

DETAILED DESCRIPTION OF THE PREFERRED EMBODIMENTS

Figure 1:
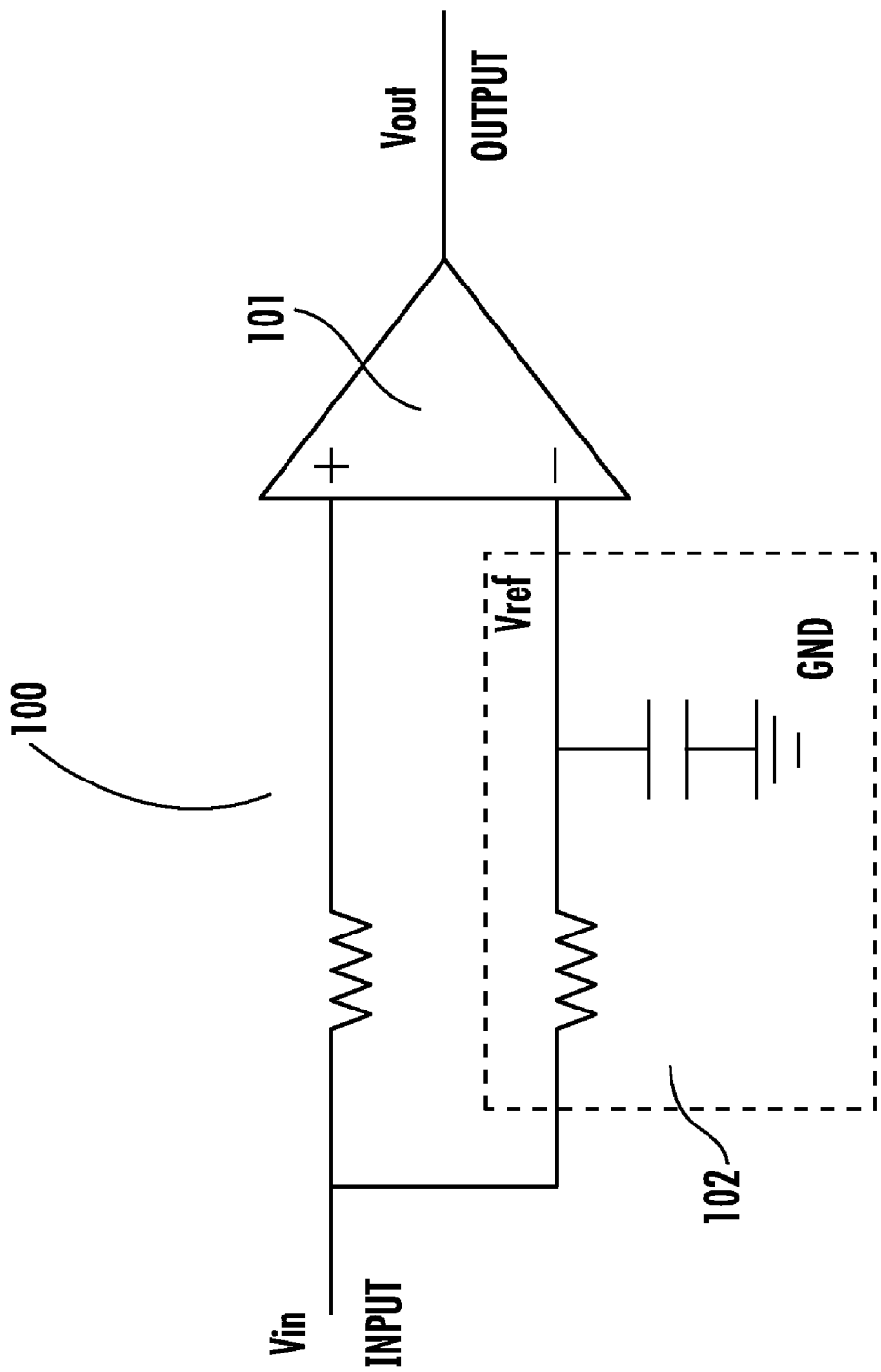
FIG. 1 schematically shows a digitizer according to the prior art.
Figure 2:
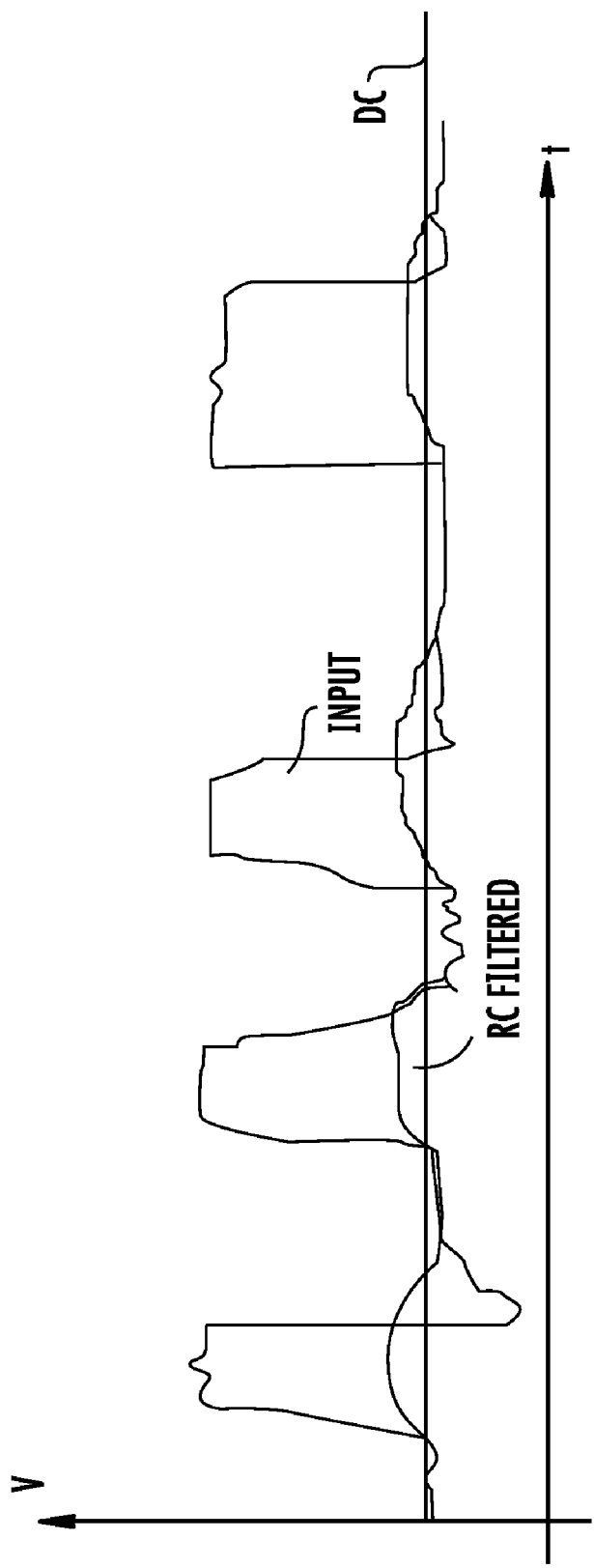
FIG. 2 schematically shows the pattern of input signal and of internal signals of a digitizer, according to the prior art.
Figure 3:
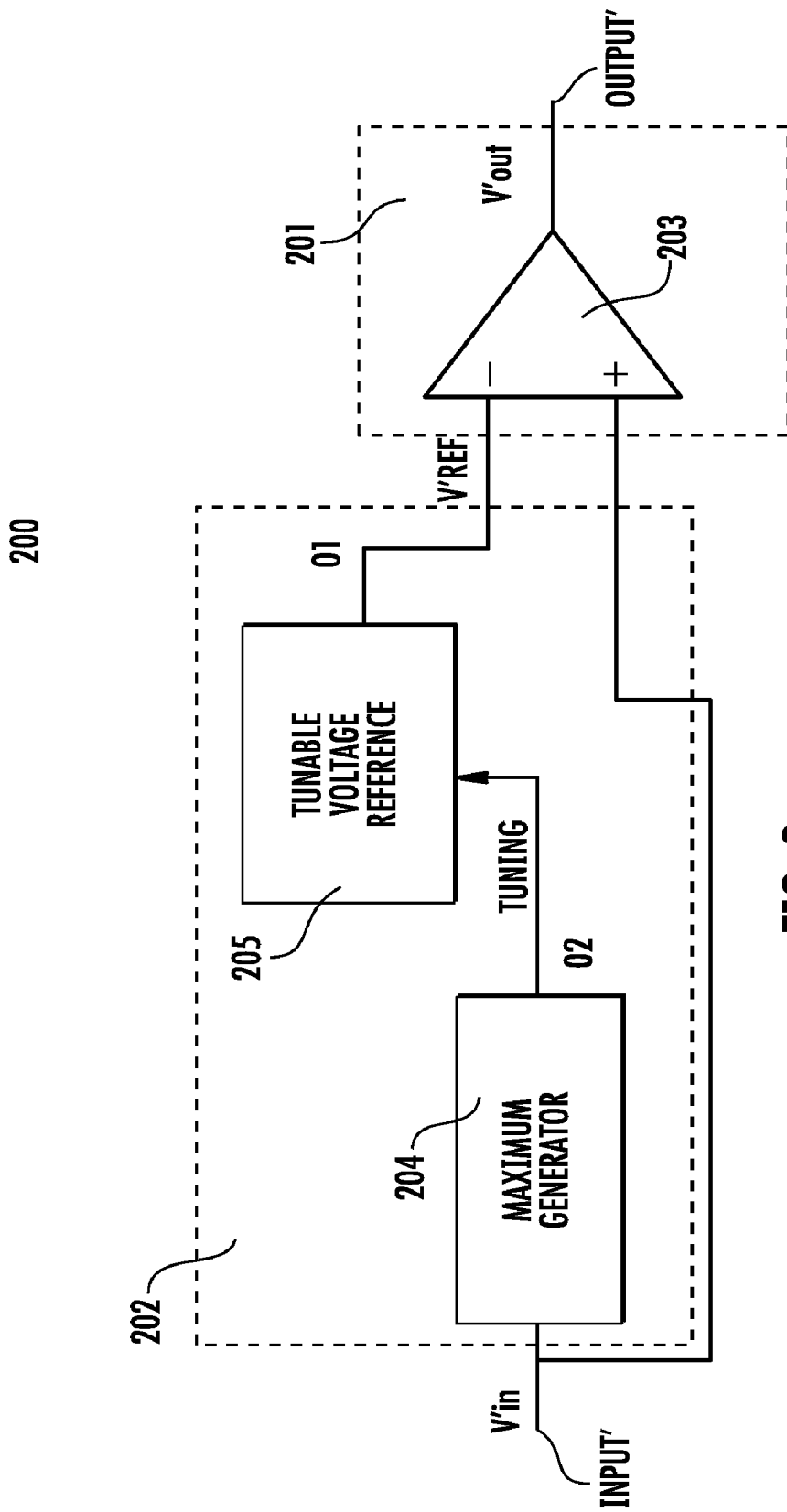
FIG. 3 schematically shows the digitizer, according to the invention.

With reference to such figures, and in particular to FIG. 3, a digitizer for a digital receiver system, like an optical receiver, is shown by way of example, globally and schematically indicated with 200. To structurally and/or functionally correlate elements to the circuits described in the prior art section, same reference numbers will be applied.

The digitizer 200 has an input terminal INPUT', which receives a modulated analog input voltage signal V'in, and an output terminal OUTPUT' which provides an output voltage signal V'out being a digital conversion of the input voltage signal V'in. The digitizer 200 includes a threshold generator circuit 202 and comparator circuit 201 inserted, in series to each other, between the input and output terminals, INPUT' and OUTPUT'.

In particular, the comparator circuit 201 includes an operational amplifier 203 having a non inverting terminal (+), directly connected to the input terminal INPUT' and an inverting terminal (−), as well as an output terminal connected to the output terminal OUTPUT' of the digitizer 200. The threshold generator circuit 202 is in turn inserted between the input terminal INPUT' of the digitizer 200 and the inverting terminal (−) of the operational amplifier 203. The threshold generator circuit 202 provides a tunable voltage reference signal V'REF at its output terminal O1,m which is connected to the inverting terminal (−) of the operational amplifier 203.

Advantageously, the threshold generator circuit 202 includes a thresholding circuit 204, for determining a maximum value Vmax of the modulated analog input voltage signal V'in coupled in series to a tunable voltage reference circuit 205 for generating the tunable voltage reference signal V'REF as a function of such a maximum value Vmax of the modulated analog input voltage signal V'in. In particular, the thresholding circuit 204 has an output terminal O2 connected to the input terminal of the tunable voltage reference circuit 205, and providing thereto a control signal TUNING being a function of the maximum value Vmax of the modulated analog input voltage signal V'in.

Figure 4:
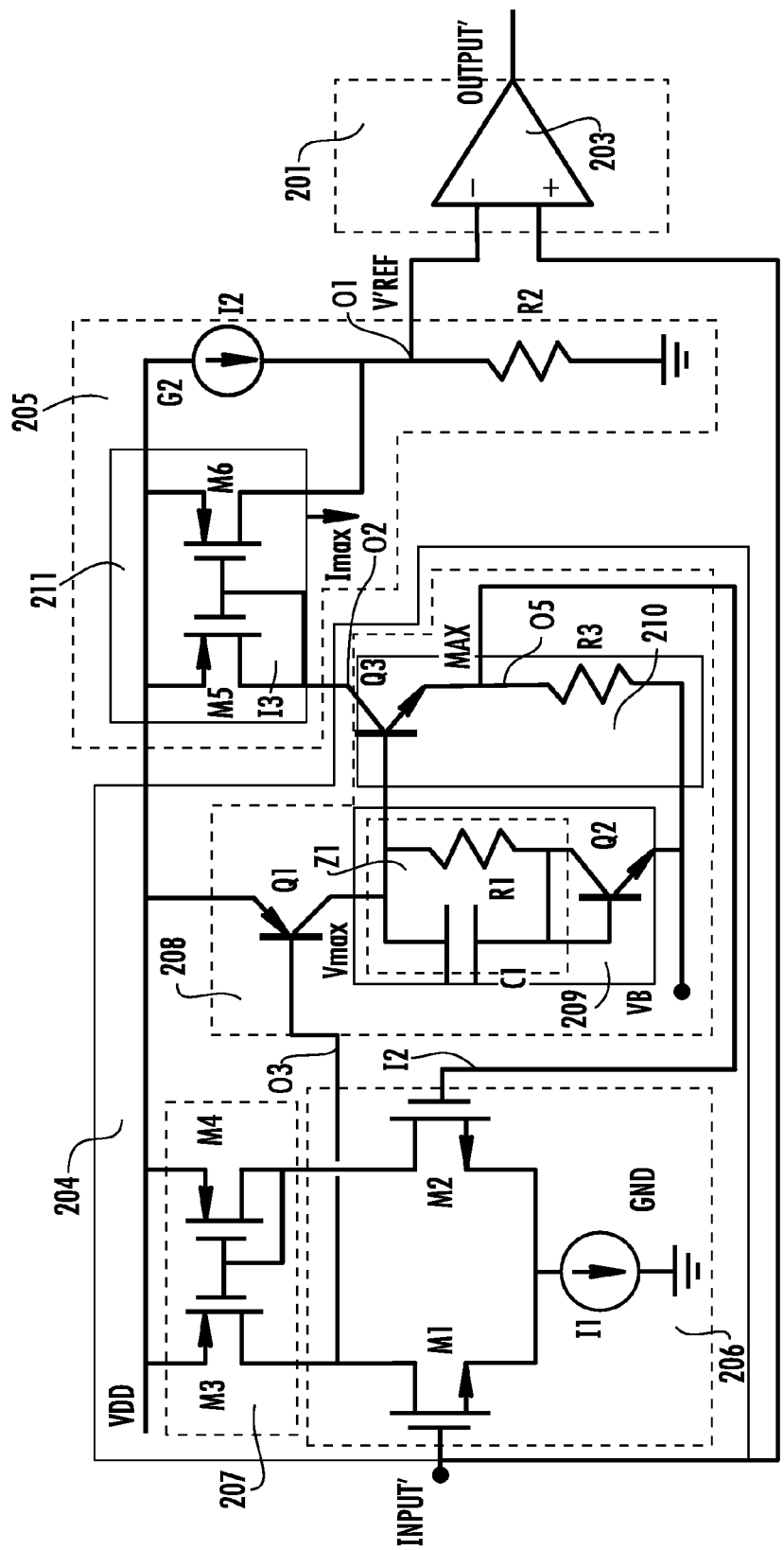
FIG. 4 schematically shows a circuital implementation of the digitizer, according to the invention.

FIG. 4 shows a preferred implementation of the digitizer 200. It should be noted that the following description of the digitizer 200 should not be intended in a limitative way, being given only as an example.

Advantageously, the maximum generator circuit 204 includes a differential input stage circuit 206 having a first input terminal coupled to the input terminal INPUT' of the digitizer 200, a current mirror circuit 207 connected to a first voltage supply reference VDD and coupled to the differential input stage circuit 206, a second stage circuit 208 coupled to the differential input stage circuit 206 in correspondence of an output terminal O3 and a second input terminal I2 thereof, and connected to the output terminal O2 of the maximum generator circuit 204. The differential input stage circuit 206 and the current mirror circuit 207 may be conventional circuits and may include bipolar or FET transistors.

More particularly, the second stage circuit 208 is inserted between the first voltage supply reference VDD and a further voltage reference VB, in particular having a constant value, and includes an input transistor Q1 acting as a second stage of amplification and having a control terminal coupled to the differential input stage circuit 206 in correspondence of the output terminal O3, a first conduction current terminal connected to the power supply reference VDD, and a second conduction terminal providing a maximum voltage value Vmax of the modulated analog input voltage signal V'in.

The second stage circuit 208 further includes a filter circuit 209, inserted between the second conduction terminal of the input transistor Q1 and the further constant voltage reference VB. The filter circuit 209 in turn includes a filter Z1 in the form of an impedance in series with a diode-connected transistor Q2.

More particularly, the filter Z1 includes a capacitor C1 and a resistor R1 connected, in parallel to each other, between the second conduction terminal of the input transistor Q1 and a first conduction terminal of the diode-connected transistor Q2. The role of the diode-connected transistor Q2 is that of restoring the right level of the DC voltage ensuring that no current is flowing through the filter circuit 209 when the modulated analog input voltage signal V'in is null.

In this way, the filter circuit 209 is able to preset a time constant of the maximum generator circuit 204, which depends on the analog voltage input signal characteristics, as for example the pulse width, the period and the received frame. The second stage circuit 208 further includes a voltage-current converting circuit 210, inserted between an output terminal of the second stage circuit 208 (which is connected to the output terminal O2 of the maximum generator circuit 204) and the further constant voltage reference VB, and having an output terminal O5 feedback connected to the second input terminal I2 of the differential input stage circuit 206.

More particularly, the voltage-current converting circuit 210 includes a buffer transistor Q3 in series with a degeneration resistor R3 inserted, in series, between the output terminal O2 of the maximum generator circuit 204 and the further constant voltage reference VB, and interconnected in correspondence of the output terminal O5. The buffer transistor Q3 has a control terminal connected to the second conduction terminal of the input transistor Q1 of the second stage circuit 208.

In this way, the voltage-current converting circuit 210 transforms the maximum voltage value Vmax of the input modulated analog voltage signal V'in received by the input transistor Q1 into a maximum current value I3, equal to the ratio between the maximum voltage value Vmax and a resistance value of the degeneration resistor R3, this current value being provided to the output terminal O2 of the maximum generator circuit 204.

Therefore, within the maximum generator circuit 204, the modulated analog input signal V'in is transferred to the output terminal O3 of the differential input stage circuit 206, and then to the control terminal of the input transistor Q1 which extracts the maximum voltage value Vmax. The second stage circuit 208 then filters this voltage signal with the filter circuit 209 and converts it into a maximum current value I3, which flows from the voltage-current converting circuit 210 toward the output terminal O2, and thus toward the tunable voltage reference circuit 205.

The tunable voltage reference circuit 205 includes a current mirror circuit 211 inserted between the power supply voltage VDD and the output terminal O2 of the maximum generator circuit 204, and connected to the inverting terminal (−) of the operational amplifier 203 of the comparator circuit 201. A current source G2 is inserted between the power supply voltage VDD and the output of the current mirror circuit 211, and connected to the inverting terminal (−) of the operational amplifier 203. An output resistor R2 is inserted between the inverting terminal (−) of the operational amplifier 203 and the second voltage reference GND. The current mirror circuit 211 may be a conventional circuit and may include bipolar or CMOS transistors.

In this way, the tunable voltage reference circuit 205 provides thereto a mirrored maximum current value Imax, being a copy of the maximum current value I3=Vmax/R3, as received by the maximum generator circuit 204, plus a constant current I2 provided by the current source G2 and converts such sum of currents, flowing through the output resistor R2, into the tunable reference voltage signal V'REF applied to the inverting terminal (−) of the operational amplifier 203.

As a consequence, the tunable voltage reference signal V'REF provided by the tunable voltage reference circuit 205 is equal to the sum of the mirrored maximum current value Imax and the value of the current source 12, multiplied for the value of the output resistor R2, according to the equation:

(Imax+I2)×R2.

It should be noted that through the degeneration resistor R3, the variation of the mirrored maximum current value Imax versus the modulated analog input signal V'in can be set. Moreover, the values of the output resistor R2 and of the constant current I2 provided by the current source G2 can be chosen in order to optimize the tunable voltage reference signal V'REF for helping provide a good noise margin when the modulated analog input signal V'in is close to the noise floor.

In this way, when a modulated analog voltage signal V'in is applied on the input terminal INPUT' of the digitizer 200, the threshold generator circuit 202 generates a tunable voltage reference signal V'REF, being a ratio between the maximum Vmax of the modulated analog voltage signal V'in and the DC component of the modulated analog voltage signal V'in, and provides it to the inverting terminal (−) of the operational amplifier 203.

Figure 5:
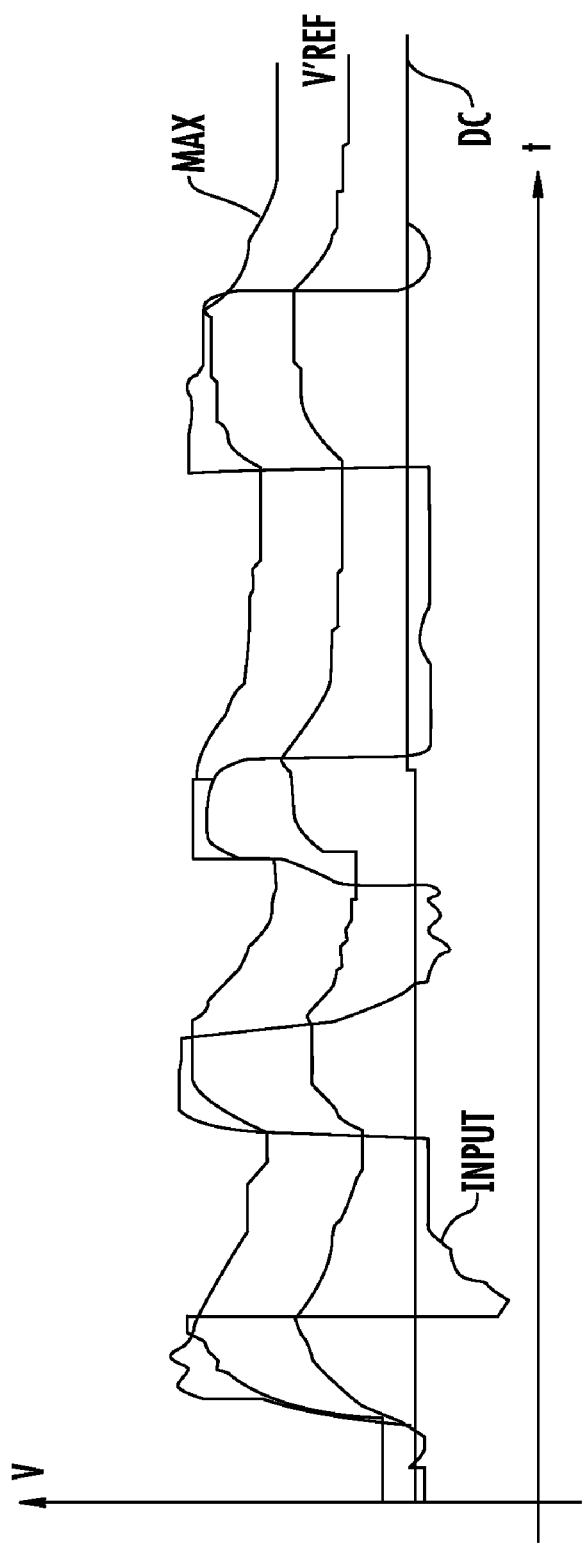
FIG. 5 schematically shows the pattern of input signal and of internal signals of the digitizer, according to the invention.

FIG. 5 shows the pattern of an input signal and of internal signals of the digitizer 200, and in particular, the modulated analog input voltage signal V'in (indicated as input), the maximum of the modulated analog input voltage signal V'in (indicated as MAX), the DC component of the modulated analog voltage input signal V'in (indicated as DC), the tunable voltage reference signal V'REF.

It is thus evident that the tunable voltage reference signal V'REF has a value between the lowest and the highest value of the modulated analog input voltage signal V'in, being the lowest value considered as the DC component.

At the end, the comparator circuit 201, through the operational amplifier 203, compares the modulated analog input voltage signal V'in and the tunable voltage reference signal V'REF in order to generate an output voltage signal V'out being a digital conversion of the modulated analog input voltage signal V'in.

The approach also relates to a method for digitizing the modulated analog input voltage signal V'in by means of the described digitizer 200. More particularly, the method includes the steps of providing the modulated analog input voltage signal V'in on the input terminal INPUT' of the digitizer 200, generating a threshold voltage signal from the modulated analog input voltage signal V'in, and comparing the modulated analog input voltage signal V'in and the threshold voltage signal in order to generate an output voltage signal V'out being a digital conversion of the input voltage signal V'in.

The step of generating a threshold voltage signal includes determining the maximum voltage value Vmax of the modulated analog input voltage signal V'in, and generating the tunable voltage reference signal V'REF from such maximum voltage value Vmax, the tunable voltage reference signal V'REF being adaptable to the modulated analog input voltage signal V'in. Moreover, the step of determining the maximum voltage value Vmax includes transferring the modulated analog input voltage signal V'in to the output terminal O3 of the differential input stage circuit 206, extracting the maximum voltage value Vmax by filtering the signal as received by the differential input stage circuit 206 through the second stage circuit 208 of the maximum generator circuit 204, and converting the maximum voltage value Vmax into the maximum current value I3, as above described with reference to the working of the digitizer 200.

In particular, the step of generating the tunable voltage reference signal V'REF further includes mirroring the maximum current value I3 in a mirrored maximum current value Imax, summing the mirrored maximum current value Imax to the constant current value I2, and converting the sum into the tunable reference voltage signal V'REF.

In essence, the digitizer and corresponding method overcome the drawbacks affecting the prior art and provides several advantages. In particular, the digitizer 200 allows a generation of a tunable voltage reference, which is adaptable to the modulated input voltage signal.

As a consequence, the dynamic threshold generated allows the preservation of the pulse width of the digitized bits, even if the amplitude of the input signal is changing. Furthermore, the digitizer 200 helps provide a good noise margin when the input signal is very close to the noise floor. In particular, the noise margin becomes adaptive guaranteeing a wide input dynamic range and a better signal over noise ratio.

That which is claimed is:

1. A digitizer for a digital receiver system comprising:
    an input terminal to receive a modulated analog input voltage signal;
    an output terminal to provide an output voltage signal being a digital conversion of the input voltage signal;
    a comparator circuit having an output coupled to said output terminal and comprising at least one operational amplifier having a first input terminal being coupled to said input terminal; and
    a threshold generator circuit between said input terminal and a second input terminal of said at least one operational amplifier, to provide a tunable voltage reference signal thereto;
    wherein said threshold generator circuit comprises a thresholding circuit to determine a threshold voltage value of the modulated analog input voltage signal, and a tunable voltage reference circuit coupled to the thresholding circuit to generate the tunable voltage reference signal as a function of the threshold voltage value of the modulated analog input voltage signal.

2. A digitizer according to claim 1, wherein said thresholding circuit further comprises an output terminal coupled to an input terminal of the tunable voltage reference circuit to provide a control signal thereto, the control signal being a function of the threshold value of the modulated analog input voltage signal.

3. A digitizer according to claim 2, wherein said threshold generator circuit further comprises:
    a differential input stage circuit coupled to said input terminal;
    a current mirror circuit coupled to a first supply voltage reference and coupled to said differential input stage circuit; and
    a second stage circuit coupled to said differential input stage circuit and to said output terminal of said threshold generator circuit.

4. A digitizer according to claim 3, wherein said second stage circuit is coupled to the first supply voltage reference and to a further voltage reference, said second stage circuit comprising:
    an input transistor having a control terminal coupled to said differential input stage circuit, a first conduction terminal coupled to the supply voltage reference, and a second conduction terminal to provide a threshold voltage value of the modulated analog input voltage signal;

a filter circuit between said second conduction terminal of said input transistor and the further voltage reference and comprising
a filter,
a diode-connected transistor having a control terminal, a first conduction terminal, and a second conduction terminal, said second conduction terminal being coupled to the further voltage reference, said control terminal being coupled to said filter,
wherein said filter is between said second conduction terminal of said input transistor and said first conduction terminal of said diode-connected transistor,
said filter circuit to preset a time constant of said threshold generator circuit; and
a voltage-current converting circuit between said output terminal of said second stage circuit and the further voltage reference, and having an input terminal coupled to said filter circuit and an output terminal coupled in a feedback configuration to said input terminal of said differential input stage circuit;
wherein said voltage-current converting circuit is to transform the threshold voltage value of the modulated analog input voltage signal to a threshold current value.

5. A digitizer according to claim 4, wherein said voltage-current converting circuit further comprises a buffer transistor and a degeneration resistor coupled in series with each other, and between said output terminal of said threshold generator circuit and the further voltage reference, said buffer transistor having a control terminal coupled to said second conduction terminal of said input transistor of said second stage circuit.

6. A digitizer according to claim 5, wherein said filter comprises at least one capacitor and at least one resistor coupled in parallel with each other and positioned between said second conduction terminal of said input transistor and said first conduction terminal of said diode-connected transistor.

7. A digitizer according to claim 4, wherein the threshold current value provided by said voltage-current converting circuit is based upon the ratio between the threshold voltage value and a resistance value of said degeneration resistor.

8. A digitizer according claim 1, wherein said tunable voltage reference circuit comprises:
a current mirror circuit between the voltage supply reference and said output terminal of said threshold generator circuit, and coupled to said second input terminal of said operational amplifier, to provide thereto a mirrored threshold current value being based up on the threshold current value provided by said voltage-current converting circuit;
a current source between the voltage supply reference and said second input terminal of said operational amplifier; and
an output resistor between said second input terminal of said operational amplifier and a ground voltage;
wherein said tunable voltage reference circuit provides the tunable voltage reference signal to said second input terminal of said operational amplifier.

9. A digitizer according to claim 8, wherein a value of the tunable voltage reference signal has a value between a low threshold and a high threshold of the modulated analog input voltage signal.

10. A digitizer according to claim 9, wherein the tunable voltage reference signal is based upon a sum of the mirrored threshold current value and a value of said current source, multiplied by a value of said output resistor.

11. An electronic device comprising:
an input terminal to receive a modulated analog input voltage signal;
an output terminal to provide an output voltage signal being a digital conversion of the input voltage signal;
a comparator circuit having an output coupled to said output terminal and comprising at least one amplifier having a first input terminal being coupled to said input terminal; and
a threshold generator circuit between said input terminal and a second input terminal of said at least one amplifier, to provide a tunable voltage reference signal thereto;
wherein said threshold generator circuit comprises a thresholding circuit to determine a threshold voltage value of the modulated analog input voltage signal, and a tunable voltage reference circuit coupled to the thresholding circuit to generate the tunable voltage reference signal as a function of the threshold voltage value of the modulated analog input voltage signal.

12. An electronic device according to claim 11, wherein said thresholding circuit further comprises an output terminal coupled to an input terminal of the tunable voltage reference circuit to provide a control signal thereto, the control signal being a function of the threshold value of the modulated analog input voltage signal.

13. An electronic device according to claim 12, wherein said threshold generator circuit further comprises:
a differential input stage circuit coupled to said input terminal;
a current mirror circuit coupled to a first supply voltage reference and coupled to said differential input stage circuit; and
a second stage circuit coupled to said differential input stage circuit and to said output terminal of said threshold generator circuit.

14. An electronic device according to claim 12, wherein said at least one amplifier comprises at least one operational amplifier.

15. An electronic device according to claim 12 wherein said input terminal, said output terminal, said comparator circuit, and said threshold generator circuit define a digitizer for a digital receiver system.

16. A method for digitizing a modulated analog input voltage signal in a digital receiver system comprising:
providing the modulated analog input voltage signal on an input terminal of the digital receiver system;
generating a tunable voltage reference signal based upon the modulated analog input voltage signal;
comparing the modulated analog input voltage signal and the tunable voltage reference signal to generate an output voltage signal, the output voltage signal being a digital conversion of the modulated analog input voltage signal; and
wherein generating the tunable voltage reference signal comprises determining a threshold voltage value of the modulated analog input voltage signal, and generating the tunable voltage reference signal based upon the threshold voltage value and the modulated analog input voltage signal.

17. A method according to claim 16, wherein determining the threshold voltage value comprises:
- transferring the modulated analog input voltage signal to an output terminal of a differential input stage circuit;
- extracting the threshold voltage value by filtering the modulated analog input voltage signal as received by the differential input stage circuit, through a second stage circuit; and
- converting the threshold voltage value into a threshold current value.

18. A method according to claim 16, wherein the tunable voltage reference signal is generated by mirroring the threshold current value in a mirrored threshold current value, summing the mirrored threshold current value with a constant current value, and converting the sum into the tunable reference voltage signal.

* * * * *